United States Patent [19]

Miknevich et al.

[11] Patent Number: 5,785,730
[45] Date of Patent: Jul. 28, 1998

[54] FERTILIZER AND METHOD FOR PREPARING THE SAME

[75] Inventors: Joseph P. Miknevich, Coraopolis; Denis E. Hassick, Monroeville, both of Pa.

[73] Assignee: Calgon Corporation, Pittsburgh, Pa.

[21] Appl. No.: 716,828

[22] Filed: Sep. 12, 1996

[51] Int. Cl.⁶ .................. C05F 3/00; C02F 11/14
[52] U.S. Cl. .................... 71/22; 71/15; 71/21; 71/23
[58] Field of Search .................... 71/11–20, 22, 71/23, 27; 210/727

[56] References Cited

U.S. PATENT DOCUMENTS

| | | | |
|---|---|---|---|
| 4,179,424 | 12/1979 | Phillips et al. | 260/29.4 |
| 4,759,856 | 7/1988 | Farrar et al. | 210/725 |
| 4,943,378 | 7/1990 | Flesher et al. | 210/725 |
| 5,132,023 | 7/1992 | Kozakiewicz et al. | 210/609 |
| 5,531,907 | 7/1996 | Williams et al. | 210/705 |
| 5,545,688 | 8/1996 | Huang | 524/827 |

FOREIGN PATENT DOCUMENTS

| | | |
|---|---|---|
| 0610955 | 8/1994 | European Pat. Off. |
| WO9514728 | 6/1995 | WIPO |

*Primary Examiner*—Gary P. Straub
*Attorney, Agent, or Firm*—Webb Ziesenheim Bruening Logsdon Orkin & Hanson, P.C.

[57] ABSTRACT

A fertilizer comprising a dewatered solid agricultural nutrient is disclosed. A method for preparing this fertilizer is provided including the steps of providing a raw agricultural waste to be treated, adding to the raw agricultural waste an effective amount of a composition comprising a quaternized amino methylated polyacrylamide polymer for separating the raw agricultural waste into a mixture having a separate clarified liquid portion and a separate dewatered nutrient solids portion, wherein the separated dewatered nutrient solids portion is a fertilizer, mixing the composition with the raw agricultural waste to facilitate the separation of the raw agricultural waste into the mixture, and subjecting the mixture to at least one mechanical separation means for segregating the separated clarified liquid portion from the fertilizer. An aqueous system comprising water, raw agricultural waste and a composition comprising a quaternized amino methylated polyacrylamide polymer is also disclosed.

6 Claims, No Drawings

FERTILIZER AND METHOD FOR PREPARING THE SAME

BACKGROUND OF THE INVENTION

1. Field Of The Invention

This invention relates to a fertilizer comprising a dewatered solid agricultural nutrient and a method for preparing this fertilizer.

2. Brief Description Of The Background Art

There is an increasing concern in the agricultural community regarding the disposal and the recycling of raw agricultural waste onto land. As new environmental legislation is enacted and enforced, the agricultural community faces pressing issues regarding the economic issues concerning the disposal of raw agricultural waste. The raw agricultural waste includes a mixture, for example, of one or more of the following: animal manure (feces), animal urine, animal milk, animal washings, farmyard scrapings, bedding material and spilled animal feed. This raw agricultural waste, for example, contains up to 99.9 weight percent moisture and is a mixture of a liquid portion and a solid portion. The variation of moisture content of the raw agricultural waste is due in part to differences, for example, in bedding material employed, diet of the livestock, and the livestock housing facilities themselves all of which influence the amount of fresh water which enters the facility for the purpose of removing (i.e., flushing) the raw agricultural waste from the area in which the livestock is housed. Utilization of water flushing systems to remove the raw agricultural waste from the area that the animals are housed is well known by those persons skilled in the art.

Because there has been a widespread use of aqueous systems in removal of raw agricultural waste, there has been an increase demand for new liquid/solid separation technology. Liquid/solid separation technology is attractive to livestock operators because the removal of the larger solids from the raw agricultural waste reduces the plugging of liquid handling equipment such as pumps, piping and sprinkling nozzles. It is well known by those skilled in the art that by removing some of the organic matter and nutrients from the waste stream in the form of solids from the raw agricultural waste, the removed solids can then be available for other uses. Producing solids that can be recycled, such as for example as a fertilizer for land application, reduces the economic hardship that a livestock operator is faced with relative to the costs associated with disposing of the solids portion of the raw agricultural waste. While a real need exists for a method for separating raw agricultural waste into a recyclable solids portion, none of the present methods available today solve or provide a complete treatment and disposal of the raw agricultural waste. There remains an unmet need that will help livestock operators manage their raw agricultural waste more effectively and offer alternative and cost effective methods for such waste disposal.

A variety of compositions and processes have been proposed to produce fertilizer using raw agricultural waste as a starting material.

Alum, a double sulfate of aluminum and potassium, has been used to consolidate the nutrients in raw agricultural waste into a solid form so that it can be hauled economically to areas that require fertilization. Generally, a belt press, known by those skilled in the art for its mechanical separation abilities, is used alone or in conjunction with the treatment using alum to achieve sufficient separation and dewatering of the raw agricultural waste. The operation of the belt press is time and manpower intensive, and thus adds to the livestock operators' cost of disposing of the raw agricultural waste. The treatment method using alum has a significant disadvantage in that the aluminum ties up the phosphorous of the treated agricultural waste in a form that generally cannot be utilized by plants as a source of phosphorous nutrient.

U.S. Pat. No. 5,531,907 (Williams et al.) discloses a settlement method for treating agricultural liquid waste to provide a purified effluent portion in a dewatered organic mass ready for composting comprising the steps of providing agricultural liquid waste to be treated and then treating the agricultural liquid waste by adding a polymer flocculent selected from the group consisting of latex polymers and dispersion polymers, an organic coagulant selected from the group consisting of an epichlorohydrin-dimethylamine condensation polymer and a polydiallyl-dimethyl ammonium chloride polymer, alone or in combination with an inorganic coagulant and a precipitant selected from a group consisting of an alkaline sodium aluminate liquor, an acidic magnesium salt in phosphoric acid/magnesium phosphate solution and mixtures of the foregoing precipitants to form a mixture. This patent states that the mixture is mixed with the agricultural liquid waste and the treated liquid waste is then permitted to settle to form a purified effluent portion and a dewatered organic mass. This patent has a disadvantage of adding aluminum to the solid product that may be spread onto land and eventually find its way onto local water courses due to runoff. This patent also has the disadvantage of providing a dewatered organic mass that contains phosphate in the form of aluminum phosphate, thus providing a peat replacement with phosphate in a form that generally cannot be utilized by plants for a source of phosphate nutrient.

It will be appreciated by those skilled in the art that the above mentioned background art does not teach or provide the livestock operator with a cost effective method of raw agricultural waste disposal and/or recycling. Therefore, in spite of this background material there remains a very real and substantial need for a method for raw separating agricultural waste into a liquid portion and a nutrient containing solids portion which may be then used for other uses such as, or example, a soil fertilizer, or used by mining companies for reclamation purposes.

SUMMARY OF THE INVENTION

The present invention has met the above described needs. The present invention provides a method for separating raw agricultural waste into a liquid portion and a nutrient solids portion comprising providing a raw agricultural waste to be treated, treating the raw agricultural waste by adding to the raw agricultural waste an effective amount of a composition comprising a quaternized amino methylated polyacrylamide polymer for separating the raw agricultural waste into a mixture having a liquid portion and a nutrient solids portion, mixing the composition comprising the quaternized amino methylated polyacrylamide polymer with the raw agricultural waste for facilitating the separation of the raw agricultural waste into the mixture having the liquid portion and the nutrient solids portion, subjecting the mixture to at least one mechanical separation means for segregating the separated liquid portion from the separated nutrient solids portion, providing a (first) collection means for collecting the separated nutrient solids portion, collecting the separated nutrient solids portion subjected to the mechanical separation means in the (first) collection means, providing another collection means (i.e., second collection means) for collecting the separated liquid portion, and collecting the separated liquid portion subjected to the mechanical separation means in another (second) collection means.

In another embodiment of this invention, the method, as mentioned hereinabove and as described herein, includes wherein the composition is a solution.

In a preferred embodiment of this invention, the composition comprising the quaternized amino methylated polyacrylamide contains polymeric microparticles. The quaternized amino methylated polyacrylamide polymeric microparticles are substituted with at least about one mole percent of tertiary amino methyl groups and have an average particle size of from about 200 to 4000 Angstroms in diameter wherein crosslinking of the polymeric microparticles occurs in the composition.

In another embodiment of this invention, the method includes employing the composition comprising the quaternized amino methylated polyacrylamide polymer as a microemulsion wherein the polymer solids content is greater than ten percent by weight based on the composition.

Yet another embodiment of this invention provides a method for transforming raw agricultural waste into a clarified liquid portion and a dewatered nutrient solids portion comprising providing a raw agricultural waste to be treated, treating the raw agricultural waste by adding to the raw agricultural waste an effective amount of a composition comprising a quaternized amino methylated polyacrylamide polymer for transforming the raw agricultural waste into a mixture having a separate clarified liquid portion and a separate dewatered nutrient solids portion, mixing the composition comprising the quaternized amino methylated polyacrylamide polymer with the raw agricultural waste to facilitate the transformation of the raw agricultural waste into the mixture having the separate clarified liquid portion and the separate dewatered nutrient solids portion, subjecting the mixture to at least one mechanical separation means for segregating the separate clarified liquid portion from the separate dewatered nutrient solids portion, providing a collection means for collecting the dewatered nutrient solids portion, collecting the dewatered nutrient solids portion subjected to the mechanical separation means in the collection means, providing another collection means for collecting the separate clarified liquid portion, and collecting the separate clarified liquid portion subjected to the mechanical separation means in another collection means.

Another embodiment of the present invention provides a fertilizer comprising a dewatered solid agricultural nutrient, wherein the dewatered solid agricultural nutrient is formed by mixing a raw agricultural waste and a composition comprising a quaternized amino methylated polyacrylamide polymer for separating the raw agricultural waste into a clarified liquid portion and the dewatered solid agricultural nutrient. The composition comprising the quaternized amino methylated polyacrylamide polymer of this invention is further described herein. A method for preparing this fertilizer is provided comprising providing a raw agricultural waste to be treated, treating the raw agricultural waste by adding to the raw agricultural waste an effective amount of a composition comprising a quaternized amino methylated polyacrylamide polymer, as described herein, for separating the raw agricultural waste into a mixture having a separate clarified liquid portion and a separate dewatered nutrient solids portion, wherein said separate dewatered nutrient solids portion is the fertilizer, mixing the composition comprising the quaternized amino methylated polyacrylamide polymer with the raw agricultural waste to facilitate the separation of said raw agricultural waste into the mixture, and subjecting the mixture to at least one mechanical separation means for segregating the separated clarified liquid portion from the fertilizer.

In another embodiment of this invention, an aqueous system is provided comprising water, a raw agricultural waste and a composition comprising a quaternized amino methylated polyacrylamide polymer, as described herein.

DETAILED DESCRIPTION OF THE INVENTION

The instant invention is directed to a method for separating raw agricultural waste into a liquid portion and a nutrient solids portion comprising providing a raw agricultural waste to be treated, treating the raw agricultural waste by adding to the raw agricultural waste an effective amount of a composition comprising a quaternized amino methylated polyacrylamide polymer for separating the raw agricultural waste into a mixture having a liquid portion and a nutrient solids portion, mixing the composition comprising the quaternized amino methylated polyacrylamide polymer with the raw agricultural waste for facilitating the separation of the raw agricultural waste into the mixture having the liquid portion and the nutrient solids portion, subjecting the mixture to at least one mechanical separation means for segregating the separated liquid portion from the separated nutrient solids portion, providing a (first) collection means for collecting the separated nutrient solids portion, collecting the separated nutrient solids portion subjected to the mechanical separation means in the (first) collection means, providing another (second) collection means for collecting the separated liquid portion, and collecting the separated liquid portion subjected to the mechanical separation means in another collection means.

As used herein, the term "raw agricultural waste" includes one of or a mixture of one or more of the following, such as for example, an animal manure (feces), an animal feed, a farmyard scrapings, an animal urine, an animal milk, an animal washings, and an animal bedding material.

As used herein, "animal bedding material" includes one of or a mixture of one or more of the following, such as for example, sand, newspaper shreddings, straw and hay.

As used herein, the term "active basis" means a concentration of additive based on the solids in the stock solution.

As used herein, the term "effective amount" refers to that amount of the composition necessary to bring about a desired result, for example, the amount needed for separating the raw agricultural waste into a mixture of a liquid portion that is separated from a nutrient solids portion.

The method of the present invention includes wherein the composition comprising the quaternized methylated polyacrylamide is substituted with tertiary amino groups. Thus, it will be appreciated that the quaternized methylated polyacrylamide polymer of the present invention is a positive charged polymer. The composition may be in the form of a solution or, preferably, an emulsion. In a more preferred embodiment of this invention, the method includes wherein the composition comprising the quaternized amino methylated polyacrylamide contains polymeric microparticles and wherein the quaternized amino methylated polyacrylamide polymeric microparticles are substituted with at least about one mole percent of tertiary amino methyl groups and have an average particle size of from about 200 to 4000 Angstroms in diameter wherein crosslinking of the polymeric microparticles occurs in the composition. In a most preferred embodiment of the method of this invention, the composition comprising the quaternized amino methylated polyacrylamide polymer is a microemulsion wherein the polymer solids content is greater than ten percent by weight based on the composition.

The quaternized methylated polyacrylamide employed in the present invention and as described herein can be made by conventional methods known by those skilled in the art. See also, for example, U.S. Pat. Nos. 4,956,399 (Kozakiewicz et al.), 5,037,881 (Kozakiewicz et al.) and 5,132,023 (Kozakiewicz et al.) that teach methods of preparing a quaternized amino methylated polyacrylamide polymer including, for example, quaternized amino methylated polyacrylamide polymers prepared using the Mannich reaction as will be appreciated and understood by those persons skilled in the art.

It will be understood by those skilled in the art that the quaternized amino methylated polyacrylamide polymer comprising the composition included in the method of the present invention, as described herein, is water soluble or water dispersible.

An effective amount of the composition is employed in the method of this invention. It will be appreciated by those skilled in the art that the dosage of the composition added to the raw agricultural waste being treated is dependent on the solids content of the raw agricultural waste, and the degree of separation and dewatering to be achieved. Generally, for example, the raw agricultural waste is from about 0.1 to 20 weight percent solids, and more typically from about 2 to about 10 weight percent solids. Therefore, it will be appreciated by those skilled in the art that the volume of water making up the raw agricultural waste ranges from about 99.9 weight percent to 80 weight percent. It will be understood by those skilled in the art that it is generally economically impractical to transport the untreated raw agricultural waste to almost any area remote from the livestock housing facility due to the volume of water that makes up the untreated raw agricultural waste. Further, it will be understood by those skilled in the art that the untreated raw agricultural waste cannot generally be applied to the soil in large or required volumes to effectively dispose of the water portion because of the potential for damaging the crops. Generally, for example, a dairy cow produces on a yearly basis about fifteen tons of animal manure (feces) containing about 27,000 pounds of water. In light of the above discussion, the method of the present invention includes wherein, for example, at least 50 ppm (parts per million) on an active basis of composition is added to a raw agricultural waste having from about 2 to about 10 weight percent solids, and preferably the present method includes wherein, for example, from about 50 ppm to about 2000 ppm on an active basis of the composition is added to treat the raw agricultural waste. Therefore, it will be appreciated by those skilled in the art that the method of the present invention includes the amount of composition that is added to achieve the desired dewatering necessary to produce a separated nutrient solid portion in the form of a dewatered cake. It will be understood that the increased degree of dewatering achieved, relative to the separated nutrient solids portion, shall increase the ease of transporting the separated nutrient solid portion as a fertilizer to a desired area located at a distance that is remote relative to the livestock housing facility. Thus, the economic benefits to be gained by the livestock operator from practicing the methods set forth by the instant invention, as described herein, will be understood by those skilled in the art.

In another embodiment of the instant invention, the method, as described herein, includes wherein the mechanical separation means provides for the segregation of the separated liquid portion as a purified filtrate and the separated nutrient solids portion as a dewatered cake. Preferably the method includes wherein the mechanical separation means is a screen. The screen has, for example, a mesh opening size of from about 0.15 millimeter to 3.0 millimeters. The method of this invention includes wherein the dewatered cake is unable to pass through the openings of the screen and includes transporting the dewatered cake from the screen to a (first) collection means. The method further includes wherein the purified filtrate passes through the openings of the screen and includes transporting the purified filtrate to another (second) collection means.

It will be appreciated by those skilled in the art that the mechanical separation means includes known separation technology, such as, for example, a stationary sloping screen, a cyclone separator, gravity based separators, piston separators, vibrating screens, belt press, roller press, or rotating screens, all of which are known by those skilled in the art.

The method of the instant invention, as described herein, includes adding the composition comprising the quaternized amino methylated polyacrylamide polymer to the raw agricultural waste by an acceptable conventional method, known by those skilled in the art. For example, the composition is added to the raw agricultural waste by directly injecting the composition into the raw agricultural waste. Further, it will be appreciated by those skilled in the art that the compositions of the instant invention may be added to the raw agricultural waste by any convenient means and method known in the art and at any convenient point before subjecting the raw agricultural waste to the mechanical separation means. It will be appreciated by those skilled in the art that the exact point or points of addition are specific to the livestock facility. Preferably the composition of this invention is added to an aqueous system having diluted raw agricultural waste ranging from about three to twenty weight percent solids content to accomplish mixing and/or dispersion of the composition of the instant invention throughout the raw agricultural waste. Preferably, the composition of the instant invention is mixed with the raw agricultural waste to facilitate adequate dispersion of the composition in the raw agricultural waste. Mixing is carried out using any suitable method known by those skilled in the art, including for example, stirring.

Another embodiment of the instant invention includes a method for transforming raw agricultural waste into a clarified liquid portion and a dewatered nutrient solids portion comprising providing a raw agricultural waste to be treated, treating the raw agricultural waste by adding to the raw agricultural waste an effective amount of a composition comprising a quaternized amino methylated polyacrylamide polymer for transforming the raw agricultural waste into a mixture having a separate clarified liquid portion and a separate dewatered nutrient solids portion, mixing the composition comprising the quaternized amino methylated polyacrylamide polymer with the raw agricultural waste to facilitate the transformation of the raw agricultural waste into the mixture having the separate clarified liquid portion and the separate dewatered nutrient solids portion, subjecting the mixture to at least one mechanical separation means for segregating the separate clarified liquid portion from the separate dewatered nutrient solids portion, providing a first collection means for collecting the dewatered nutrient solids portion, collecting the dewatered nutrient solids portion subjected to the mechanical separation means in the first collection means, providing a second collection means for collecting the separate clarified liquid portion, and collecting the separate clarified liquid portion subjected to the mechanical separation means in the second collection means.

Preferably, the method for transforming raw agricultural waste into a clarified liquid portion and a dewatered nutrient solids portion of the present invention, as described herein, includes adding the composition to the raw agricultural waste and subjecting the mixture to the mechanical separation means, as described herein. This method includes wherein the dewatered nutrient solids portion is retained by the mechanical separation means and including transporting the dewatered nutrient solids portion from the mechanical separation means to the first collection means. Further, this method includes wherein the clarified liquid portion passes through the mechanical separation means and including transporting the clarified liquid portion to the second collection means. Further the method of the instant invention includes removing the dewatered nutrient solids portion from the collection means and applying the dewatered nutrient solids portion to the soil for effecting enrichment of the soil.

In another embodiment of this invention, a fertilizer is provided comprising a dewatered solid agricultural nutrient, the dewatered solid agricultural nutrient being formed by mixing a raw agricultural waste and a composition comprising a quaternized amino methylated polyacrylamide polymer for separating the raw agricultural waste into a clarified liquid portion and the dewatered solid agricultural nutrient. The composition comprising the quaternized amino methylated polyacrylamide polymer is described herein.

The instant invention provides for a method for preparing the fertilizer comprising providing a raw agricultural waste to be treated, treating the raw agricultural waste by adding to the raw agricultural waste an effective amount of a composition comprising a quaternized amino methylated polyacrylamide polymer, as described herein, for separating the raw agricultural waste into a mixture having a separate clarified liquid portion and a separate dewatered nutrient solids portion, wherein the separate dewatered nutrient solids portion is a fertilizer, mixing the composition comprising the quaternized amino methylated polyacrylamide polymer with the raw agricultural waste to facilitate the separation of the raw agricultural waste into the mixture, and subjecting the mixture to at least one mechanical separation means for segregating the separated clarified liquid portion from the fertilizer.

Yet another embodiment of this invention provides an aqueous system comprising water, a raw agricultural waste, and a composition comprising a quaternized amino methylated polyacrylamide polymer. The quaternized amino methylated polyacrylamide polymer of this aqueous system is described herein.

EXAMPLES

The following examples demonstrate the invention in greater detail. These examples are not intended to limit the scope of the invention in any way. In the examples the following products were used:

Composition A is a quaternized amino methylated polyacrylamide polymer and is commercially available as a five percent active solution from Allied Colloids, Bativa, Ill., U.S.A., currently bearing the "PERCOL 7972-CS" trademark.

Composition B is a quaternized amino methylated polyacrylamide polymer that is commercially available as a thirty-two percent active microemulsion from Cytec, Stamford, Conn., U.S.A., currently bearing the "Excel 100" trademark.

Composition C is a (nonquaternized) amino methylated polyacrylamide polymer that is commercially available as a six percent active product from Calgon Corporation, Pittsburgh, Pa., U.S.A.

Composition D is a 25 weight % active acryloyloxyethyl trimethyl ammonium chloride/acrylamide copolymer commercially available from Calgon Corporation, Pittsburgh, Pa., U.S.A., comprising about sixty-five percent by weight acryloyloxyethyl trimethyl ammonium chloride and about thirty-five percent by weight acrylamide.

Examples 1–4

In Examples 1–4, various formulations were tested for their effectiveness in separating raw agricultural waste into a mixture of a liquid portion and a nutrient solids portion. Evidence of separation is demonstrated by the ability of each composition to effect separation of the raw agricultural waste and flocculation of the nutrient solids portion. Each composition, relative to its active basis as supplied by each manufacturer, respectively, was adjusted or made down as will be understood by those skilled in the art, to similar solids content so that each composition was tested based on similar amounts of active polymer. In the Examples, the raw agricultural waste sample (200 milliliters) having about 2.26 weight percent solids was obtained from a dairy livestock farmyard in the State of Ohio.

Specifically, each composition set forth in Examples 1–4 was added in the amounts indicated in Table I by directly injecting the composition into the aqueous mixture of the raw agricultural waste having about 2.26 percent solids to form an aqueous system comprising water, raw agricultural waste, and one of the formulations set forth in Example Nos. 1, 2, 3 or 4, respectively. Each aqueous system was then mixed by stirring. Each formulation was observed for its ability to separate the raw agricultural waste into a mixture having a flocculated separated nutrient solids portion and a separated liquid portion. The observed results are set forth in Table I.

TABLE I

| Example | | Amount of Composition in ppm added to raw agricultural waste and appearance | | |
|---|---|---|---|---|
| No. | Composition | 500 | 600 | 1000 |
| 1 | A | Flocculation occurring, raw agricultural waste separating | Well defined floc, break of waste; separated nutrient solids portion; separated clarified filtrate liquid portion | — |

TABLE I-continued

| Example No. | Composition | Amount of Composition in ppm added to raw agricultural waste and appearance | | |
|---|---|---|---|---|
| | | 500 | 600 | 1000 |
| 2 | B | Flocculation occurring, raw agricultural waste separating | Well defined floc, break of waste; separated nutrient solids portion; separated clarified filtrate liquid portion | — |
| 3 | C | No flocculation, no break; dark raw agricultural waste | No flocculation, no break; dark raw agricultural waste | No flocculation, no break; dark raw agricultural waste |
| 4 | D | No flocculation, no break; dark raw agricultural waste | No flocculation, no break; dark raw agricultural waste | No flocculation, no break; dark raw agricultural waste |

Table I shows that the method for separating raw agricultural waste of the present invention, Examples Nos. 1 and 2, produced superior results by effectively separating the raw agricultural waste sample containing about 6 weight percent solids into a separated flocculated nutrient solids portion and a separated clarified liquid portion. The results show that Composition C, a (nonquaternized) amino methylated polyacrylamide polymer is not effective to achieve separation of the raw agricultural waste sample. Further, Table I demonstrates that Composition D, a conventional waste treatment flocculent acryloyloxyethyl trimethyl ammonium chloride copolymer was ineffective for achieving separation of the raw agricultural waste sample.

Examples 5–6

In Examples 5 and 6, the method of the present invention wherein either Composition A (Example 5) or Composition B (Example 6) was added to the raw agricultural waste sample following the procedure as described above for Examples 1–4, was carried out. Further, the aqueous system mixture was subjected to mechanical separation means for segregating the separated liquid portion (filtrate) from the nutrient solids portion. More specifically, the mechanical separation means employed in Examples 5–6 was a size 20 mesh screen (0.85 millimeter), well known to those skilled in the art. The above procedure was also followed with the exception that no quaternized amino methylated polyacrylamide polymer was added to the raw agricultural waste. The results of both of these procedures is set forth in Tables II and III. Table II and Table III show in column format, left to right, the following: parameter/constituent contents (column 1), of the raw agricultural waste pretreatment (Raw) (column 2); filtrate obtained by using a mechanical separation means for separation of raw agricultural waste but without the addition of a quaternized amino methylated acrylamide polymer of this invention (column 3); filtrate obtained using the method of this invention wherein a quaternized amino methylated acrylamide polymer was employed (column 4); and a nutrient solids portion resulting from employing the method of the present invention (column 5).

TABLE II

| Parameter/Constituent | Raw | Filtrate Untreated | Filtrate After Treatment Of Raw With Composition A | Nutrient Solids Portion Achieved After Treatment Of Raw With Composition A |
|---|---|---|---|---|
| Total Solid | 2.26% | 2.04% | 0.49% | 8.8% |
| Total Phosphorus, ppm as $PO_4$ | 770 | 730 | 6.7 | 4150 |
| Total Aluminum, ppm | 21 | 26 | <0.24 | 170 |
| Total Barium, ppm | 0.6 | 0.5 | <0.2 | 3 |
| Total Calcium, ppm | 590 | 620 | 49 | 3000 |
| Total Copper, ppm | 32 | 31 | <0.12 | 170 |
| Total Iron, ppm | 41 | 41 | <0.24 | 240 |
| Total Magnesium, ppm | 320 | 310 | 78 | 1100 |
| Total Manganese, ppm | 9.4 | 9.3 | 0.2 | 47 |
| Potassium, ppm | 1500 | 1500 | 880 | 870 |
| Sodium, ppm | 530 | 520 | 290 | 340 |
| Total Zinc, ppm | 5.9 | 6.2 | <0.12 | 34 |

TABLE III

| Parameter/Constituent | Raw | Filtrate Untreated | Filtrate After Treatment Of Raw With Composition B | Nutrient Solids Portion Achieved After Treatment Of Raw With Composition B |
| --- | --- | --- | --- | --- |
| Total Solid | 2.26% | 2.04% | 0.43% | 10.1% |
| Total Phosphorus, ppm as $PO_4$ | 770 | 730 | 3.3 | 3850 |
| Total Aluminum, ppm | 21 | 26 | <0.3 | 120 |
| Total Barium, ppm | 0.6 | 0.5 | <0.3 | 5 |
| Total Calcium, ppm | 590 | 620 | 39 | 3300 |
| Total Copper, ppm | 32 | 31 | <0.2 | 170 |
| Total Iron, ppm | 41 | 41 | <0.3 | 240 |
| Total Magnesium, ppm | 320 | 310 | 71 | 1200 |
| Total Manganese, ppm | 9.4 | 9.3 | 0.2 | 52 |
| Potassium, ppm | 1500 | 1500 | 810 | 860 |
| Sodium, ppm | 530 | 520 | 270 | 290 |
| Total Zinc, ppm | 5.9 | 6.2 | <0.2 | 33 |

Table II shows that the method of the instant invention including adding Composition A to the untreated raw agricultural waste (Raw) provides for the separation of the untreated raw agricultural waste (Raw of column 1) into (a) a treated liquid portion (filtrate of column 4) having a low solids content of 0.49% in comparison to the untreated filtrate (column 3) having a solids content of 2.04% and (b) a nutrient solids portion (column 5) having (1) a solids content of 8.8% compared to the solids content of the untreated raw agricultural waste (Raw of column 1) of 2.26%, and (2) elemental constituents such as phosphorous, calcium, magnesium, manganese and zinc, in a concentrated form in comparison to the untreated raw agricultural waste (Raw of column 1).

Table III shows that the method of the instant invention including adding Composition B to the untreated raw agricultural waste (Raw of column 1) provides for the separation of the untreated raw agricultural waste (Raw of column 1) into (a) a treated liquid portion (filtrate of column 4) having a low solids content of 0.43% in comparison to the untreated filtrate (column 3) having a solids content of 2.04%, and (b) a nutrient solids portion (column 5) having (1) a solids content of 10.1% compared to the solids content of the untreated raw agricultural waste (Raw of column 1) of 2.26% and (2) elemental constituents, such as phosphorous, calcium, magnesium, manganese and zinc in a concentrated form in comparison to the untreated raw agricultural waste (Raw of column 1). It will be appreciated by those skilled in the art that the method of the instant invention not only provides a nutrient solids portion in a dewatered mass having a concentrated solids content but also further provides (1) concentrated elemental constituents in comparison to the untreated raw agricultural waste and (2) a clarified low solids containing treated filtrate liquid portion. It will be understood by those skilled in the art that providing such a nutrient solids portion of the instant invention having the above described characteristics allows the nutrient solids portion to be useful as a fertilizer that may economically be transported for soil application purposes at locations great distances from the livestock facility. Further, the treated clarified filtrate liquid portion having a low solids content may, such as for example, be recycled and employed to flush the livestock operators facility, or be spread onto the soil directly, such as for example, for enrichment purposes.

Whereas particular embodiments of the instant invention have been described for purposes of illustration, it will be evident to those skilled in the art that numerous variations and details of the instant invention may be made without departing from the instant invention as defined in the appended claims.

What is claimed is:

1. A method for preparing a fertilizer comprising:
    (a) providing a raw agricultural waste, said raw agricultural waste being an aqueous mixture containing 0.1 to 20 weight percent solids, said solids being predominately one or more of an animal manure, an animal feed, an animal bedding, and farmyard scrapings, and an aqueous portion being predominately one or more of an animal urine, an animal milk, and an animal washings, to be treated;
    (b) treating said agricultural waste by mixing said raw agricultural waste with an effective amount of a composition comprising a quaternized amino methylated polyacrylamide polymer for separating said raw agricultural waste into a mixture having a separate clarified liquid portion and a separate dewatered nutrient solids portion of substantially reduced water content, wherein said separate dewatered nutrient solids portion is a fertilizer, and wherein said quaternized amino methylated polyacrylamide contains polymeric microparticles which microparticles are substituted with at least about one mole percent of tertiary amino methyl groups and having an average particle size of from about 200 to 4000 Angstroms in diameter wherein crosslinking of said polymeric microparticles occurs in said composition, and wherein said composition is a microemulsion wherein the polymer solids content is greater than ten percent by weight based on said composition; and
    (c) subjecting said mixture from step (b) to at least one mechanical separation means for segregating said separated clarified liquid portion from said dewatered nutrient solids portion.

2. The method of claim 1 including wherein said composition is a solution.

3. The method of claim 1 including wherein said composition is added to said raw agricultural waste by directly injecting said composition into said raw agricultural waste.

4. A fertilizer comprising the dewatered nutrient solids portion produced by claim 1.

5. The fertilizer of claim 4 wherein said composition comprising said quaternized amino methylated polyacrylamide polymer is a solution.

6. The fertilizer of claim 4 wherein said composition comprising said quaternized amino methylated polyacrylamide polymer is a microemulsion.

* * * * *